United States Patent [19]
Itoh et al.

[11] Patent Number: 5,614,663
[45] Date of Patent: Mar. 25, 1997

[54] CANTILEVER FOR USE WITH ATOMIC FORCE MICROSCOPE AND PROCESS FOR THE PRODUCTION THEREOF

[75] Inventors: Junju Itoh; Yasushi Toma, both of Ibaraki-ken, Japan

[73] Assignees: Ebara Research Co., Ltd., Fujisawa; Agency of Industrial Science and Technology, Tokyo, both of Japan

[21] Appl. No.: 448,790

[22] Filed: May 24, 1995

Related U.S. Application Data

[62] Division of Ser. No. 311,018, Sep. 22, 1994.

[30] Foreign Application Priority Data

Sep. 24, 1993 [JP] Japan .................................. 5-261480

[51] Int. Cl.$^6$ ........................................................ G01B 5/28
[52] U.S. Cl. ............................................................ 73/105
[58] Field of Search ............................. 73/105; 250/306, 250/307

[56] References Cited

U.S. PATENT DOCUMENTS 5,302,239 4/1994 Roe et al. .............................. 250/306
5,354,985 10/1994 Quate .................................... 250/306

OTHER PUBLICATIONS

Binnig et al., Atomic Resolution with Atomic Force Microscope, Europhys. Lett., 3(12), 15 Jun. 1987, pp. 1281–1286.
Kikuta et al., Force Microscopy Using Common–Path Optical–Heterodyne Interferometer, Japanese Journal of Applied Physics, Part I, vol. 30, No. 3, Mar. 1991, pp. 587–590.
T.R Albrecht et al., Microfabrication of Cantilever Styli for the Atimic force Microscope, J. Vac Sci. Technol. A 8(4), Jul./Aug. 1990, pp. 3386–3396.
M.M. Farooqui et al., Micromachined Silicon Sensors for Atomic Force Microscopy, Nanotechnology 3 (1992), pp. 91–97.
L.C. Kong et al., Integrated Electrostatically Resonant Scan Tip for an Atomic Force Micriscope, J. Vac. Sci. Technol. B 11(3), May/Jun. 1993, pp. 634–641.

Primary Examiner—Thomas P. Noland
Assistant Examiner—Daniel S. Larkin
Attorney, Agent, or Firm—Armstrong, Westerman, Hattori, McLeland, & Naughton

[57] ABSTRACT

The improved cantilever for use with an atomic force microscope comprises a single-crystal silicon base 11 having adequate mechanical strength, a cantilever beam 12 that is made from a silicon oxide film and which is joined at one end to the base, and a conical stylus 13 with a sharp tip that is formed of single-crystal silicon on the cantilever beam 12 at the 6 other end which is opposite the end joined to the base 11, and all surfaces of the cantilever are covered with a thin electroconductive film 14. If desired, protective plates 15 for protecting the cantilever beam against mechanical damage may be provided that are processed from the base material in such a way that they hold the beam therebetween and which have satisfactory strength. The stylus has an abrupt profile with a sharp tip and a high aspect ratio, and the cantilever beam has an invariable spring constant and supports the stylus at an end. The cantilever can be produced by a process comprising steps (a)–(k).

6 Claims, 5 Drawing Sheets

5,614,663

CANTILEVER FOR USE WITH ATOMIC FORCE MICROSCOPE AND PROCESS FOR THE PRODUCTION THEREOF

This is a division, of application Ser. No. 08/311,018 filed Sep. 22, 1994.

BACKGROUND OF THE INVENTION:

This invention relates to a cantilever for use with an atomic force microscope and a process for producing the same. More particularly, the invention relates to cantilevers equipped with styli that are indispensable for use in scanning atomic force microscopes (AFMs) which are becoming increasingly popular as tools for profiling surface geometries at atomic resolutions. The invention also relates to a process for producing such cantilevers. Specifically, the invention relates to cantilevers that are effective for use not only with AFMs but especially with scanning Maxwell stress microscopes (SMMs), as well as a process for producing such cantilevers.

Heretofore marketed or discussed cantilevers for use with atomic force microscopes of the type contemplated by the present invention are classified into three major types as illustrated in FIGS. 6a, 6b, and 6c. The cantilever shown in FIG. 6a is currently available on the market and is characterized by comprising a single-crystal silicon base 51 which is processed to a cantilever beam 52 and a stylus 53 formed primarily by wet etching with an aqueous KOH solution. The angle of the tip of the stylus 53 is determined by the face direction of the single-crystal silicon base 51 and is typically about 70 degrees since a commonly employed base has a (100) face.

FIG. 6b shows the cantilever published by T. R. Albrecht et al., in 1990. Base 51 is made from a (100) single-crystal silicon film and has a cantilever beam 52 and a stylus 53 which are formed of either a thermally oxidized film or a nitride film (T. R. Albrecht et al., J. Vac. Sci. Technol., A8 (1990) 3386–3396). With this cantilever, it is extremely difficult to produce an adequately sharp point at the tip of the stylus 53 made from the thermally oxidized film and the stylus tip of the cantilever is not sufficiently sharp. The cantilever shown in FIG. 6c was published by M. M. Farooqui in 1992 and it comprises an n-type silicon base 51 having a highly boron doped layer formed on a surface from which a cantilever beam 52 and a stylus 53 were formed (M. M. Farooqui et al.; Nanotechnology, 3 (1992) 91–97). With this cantilever, the thickness of the boron diffusion layer is equal to the sum of the height of the stylus 53 and the thickness the cantilever beam 52 and the portion of that layer which remains after processing the stylus 53 by dry etching provides the thickness of the cantilever beam 52. Therefore the thickness of the stylus 53 and the thickness of the cantilever beam 52 are highly dependent on the conditions for dry etching the stylus 53.

FIG. 6d shows a cantilever published by L. C. Kong et al., in 1993. A single-crystal silicon base 51 is furnished with a cantilever beam 52 that is formed from a silicon oxide film or a nitride film and the beam 52 is overlaid with a polysilicon layer which in turn is processed by dry etching and thermal oxidation to form a stylus 53 (L. C. Kong et al., J. Vac. Sci. Technol. B11 (1993) 634–641). Since this cantilever has small (ca. 0.1 µm) grain boundaries in the polysilicon layer it is difficult to sharpen the tip of the stylus to less than 0.1 µm and, as a matter of fact, the published cantilever has a stylus tip of about 0.1 µm.

Cantilevers suitable for use with AFMs must satisfy the following conditions:

(1) stylus 53 not only has a sufficiently sharp tip to permit profile mapping at atomic resolutions but also has been processed to provide a large aspect ratio (the ratio of stylus height to the diameter of its bottom);

(2) cantilever beam 52 has an invariable spring constant; and (3) cantilever beam 52 is resistant to mechanical damage during handling.

To meet the second requirement the cantilever beam has to be formed with high reproducibility and consistency in terms of not only the quality of the film from which it is made but also its size, especially its thickness. None of the prior art cantilevers shown in FIG. 6 satisfy all of the conditions (1)–(3). With the cantilevers shown in FIGS. 6a, 6b and 6d, it is theoretically difficult to sharpen the tip of stylus 53. The cantilever shown in FIG. 6c has an inherent defect in that the height of stylus 53 and the thickness of beam 52 are highly sensitive to variations in the processing conditions for their formations. At the same time, the cantilever beam which is formed of the highly concentrated boron diffusion layer ( $10^{20}$ B atoms/cm$^3$) with great internal stress has inherent flex and its spring constant will change non-linearly under deflection, which presents a serious obstacle to measurements with AFM.

A common problem with the four prior art cantilevers is that the height of stylus 53 is no more than about 3–5 µm and the aspect ratio 1 or less. In addition, the cantilever beam 52 in all prior art cases is completely exposed from the base 51 and has no protecting mechanism of any kind.

SUMMARY OF THE INVENTION

The present invention has been accomplished under the circumstances described above and has as an object the provision of a cantilever for use with an atomic force microscope that has a stylus of an abrupt profile with a sharp tip and a high aspect ratio, as well as a cantilever beam that has an invariable spring constant and which supports the stylus at an end.

Another object of the invention is to provide a cantilever for use with an atomic force microscope that additionally has protective plates that protect the cantilever beam against mechanical damage.

A further object of the invention is to provide processes for producing said cantilevers.

The first object of the invention is attained by the cantilever for use with an atomic force microscope which comprises a single-crystal silicon base having adequate mechanical strength, a cantilever beam that is made from a silicon oxide film and which is joined at one end to the base, and a conical stylus with a sharp tip that is formed of single-crystal silicon on the cantilever beam at the other end which is opposite the end joined to the base, wherein all surfaces of the cantilever are covered with a thin electroconductive film.

The second object of the invention is attained by the cantilever for use with an atomic force microscope which comprises a single-crystal silicon base having adequate mechanical strength, a cantilever beam that is made from a silicon oxide film and which is joined at one end to the base, and a conical stylus with a sharp tip that is formed on the cantilever beam at the other end which is opposite the end joined to the base, wherein protective plates for protecting the cantilever beam against mechanical damage that are processed from the single-crystal silicon base and that have adequate strength are provided on the base side of the cantilever beam protruding from the base in such a way that they are spaced with good clearance from the cantilever beam but such that they hold said cantilever beam therebetween, and wherein all surfaces of the cantilever are covered with a thin electroconductive film.

The cantilever for use with an atomic force microscope may be produced by a process comprising the following steps (a)–(k):

(a) a substrate composed of a (100) single-crystal silicon base having adequate mechanical strength, a silicon oxide film formed thereon by thermal oxidation, and a (100) single-crystal silicon film formed on said thermally oxidized film by bonding is oxidized thermally to form a thermally oxidized film 0.5–1 μm thick on the surface of the single-crystal silicon film over said thermally oxidized silicon film;

(b) the thermally oxidized film on the surface of said bonded single-crystal silicon film is processed to a circle with a diameter of 10–15 μm;

(c) with said circularly processed thermally oxidized film being used as a mask, said bonded single-crystal silicon film is processed to a generally conical stylus geometry by the combination of reactive ion etching (RIE) and wet etching with an aqueous KOH solution and, at the same time, the thermally oxidized film which underlies said bonded single-crystal silicon film is exposed;

(d) said exposed thermally oxidized film is processed to a cantilever beam geometry;

(e) a thermally oxidized film is formed on all surfaces of the structure formed by steps (a) to (d);

(f) a resist is applied to a thickness of at least 5 μm so as to protect said roughly processed conical stylus and the resist is then processed in registry with the cantilever beam geometry as processed in said step (d);

(g) the thin thermally oxidized film which has been formed as the resist in step (e) is processed to the cantilever beam geometry so as to have the underlying silicon base exposed and said resist is then stripped;

(h) the silicon base around the cantilever beam geometry which has become exposed in said step (g) is etched away by wet etching with an aqueous KOH solution so that a cantilever beam formed of said thermally oxidized film is freely suspended from said silicon base;

(i) the thin thermally oxidized film which has been formed on the surface of the stylus in said step (e) is etched to provide a sharp tip;

(j) the base from which the cantilever beam has become freely suspended in said step (h) is cut off at the site lying underneath said cantilever beam; and (k) all surfaces of the structure that have been formed in said steps (a)–(j) are covered with a thin electroconductive film.

The cantilever for use with an atomic force microscope may be produced by a process comprising the above-mentioned steps (a)–(k), which is further characterized in that an opening through which laser light is to be applied to the reverse side of the cantilever beam that is formed of said thermally oxidized film and which was freely suspended from said silicon base in step (h) is formed at a desired site of said silicon base by a processing technique that is the combination of dry etching and wet etching.

The cantilever for use with an atomic force microscope has the structure already described above and it can be produced by said steps (a)–(k), in which a single-crystal silicon substrate serving as a cantilever base is provided on the surface with a thermally oxidized ($SiO_2$) film having a preliminarily designed thickness, which in turn is overlaid with a single-crystal silicon layer to a thickness of a constant design value, thereby providing a three-layered structure, and the thermally oxidized film is processed to form a cantilever beam and a stylus is processed from the overlying single-crystal silicon layer of a constant thickness. The cantilever thus produced has a stylus made of single-crystal silicon which has a sharp tip and a constant height, and the cantilever beam having an invariable spring constant.

The cantilever for use with an atomic force microscope has protective plates of adequate mechanical strength provided in such a way that they hold the cantilever beam therebetween and, hence, the cantilever beam is effectively protected against mechanical damage.

In either type of cantilever, the stylus is made of single-crystal silicon and does not contain microscopic grain boundaries which are inherent in polysilicon; therefore, the stylus tip can be sharpened to a curvature radius of 10 nm or below by a suitable technique such as the combination of dry etching (RIE) and thermal oxidation.

If the single-crystal silicon film has a (100) face, high-rate etching can be carried out with an aqueous KOH solution in the direction of film thickness so that the stylus is rendered to have a height up to about 10 μm and a high aspect ratio.

The cantilever beam is formed from a thermally oxidized film having a constant thickness and freely suspended from the silicon base. The etching means for the silicon base, such as wet etching with an aqueous KOH solution, which enables the cantilever beam to be freely suspended from the base is totally inert to the thermally oxidized film. Hence, the thickness of the thermally oxidized film in no way changes during the process and the cantilever beam is formed exactly to the thickness of a design value with good reproducibility, which contributes to a marked improvement in the reproducibility of its spring constant.

If the single-crystal silicon base has a (100) face, high-rate selective etching can be carried out with an aqueous KOH solution in the direction of film thickness and this offers the advantage of facilitating the processing of the protective plates from the silicon base.

THE PREFERRED EMBODIMENTS OF THE INVENTION

The two preferred embodiments of the invention are described below with reference to FIGS. 1–5.

EXAMPLE 1

Figure 1:
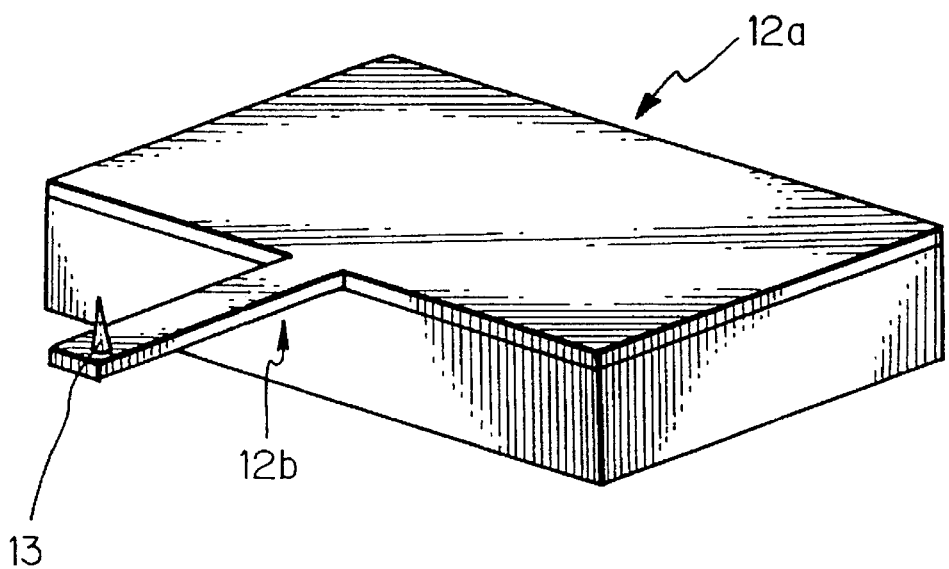
FIG. 1 is a perspective view showing the exterior appearance and structure of a cantilever for use with an atomic force microscope according to an embodiment of the invention.
Figure 2:
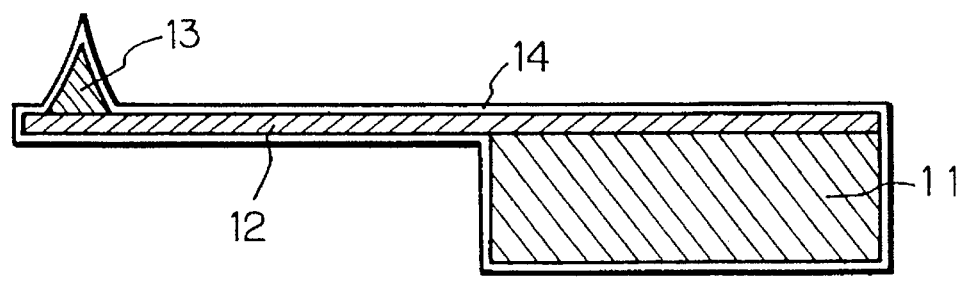
FIG. 2 is a longitudinal section also showing the structure of said cantilever.

FIG. 1 is a perspective view showing the exterior appearance and basic structure of the cantilever for use with an atomic force microscope, and FIG. 2 is a longitudinal section also showing the structure of said cantilever. The cantilever shown in FIG. 1 comprises a single-crystal silicon base 11 that has a thickness of about 500 μm and which has a cantilever beam 12 joined securely at an end to the base 11. The beam 12 is formed of a thermally oxidized ($SiO_2$) film in a thickness of 1 –2 μm. The cantilever beam 12 consists of a beam portion 12b and a basal portion 12a which is joined securely to the base 11. A conical stylus 13 of high aspect ratio that has been processed from single-crystal silicon and which has a sharp tip is provided at the other end of the cantilever beam 12 which is opposite the end joined to said base 11.

The stylus 13 has a height of 8–10 μm and an aspect ratio of at least 2. The cantilever beam 12 has a width of 15–30 μm and protrudes from the base 11 by a length of 120–150 μm. The cantilever beam 12 of these dimensions has a resonant frequency of at least 50 kHz.

To provide electric conductivity, all surfaces of the cantilever for use with an atomic force microscope which has the basic structure described just above are covered with a thin gold (Au) film 14. In the embodiment under consideration, the gold film 14 suffices to have a thickness of 10 nm and less. Covering all the surfaces of the structure with the thin gold film 14 is little influential on the resonant frequency of the cantilever beam 12.

EXAMPLE 2

Figure 3:
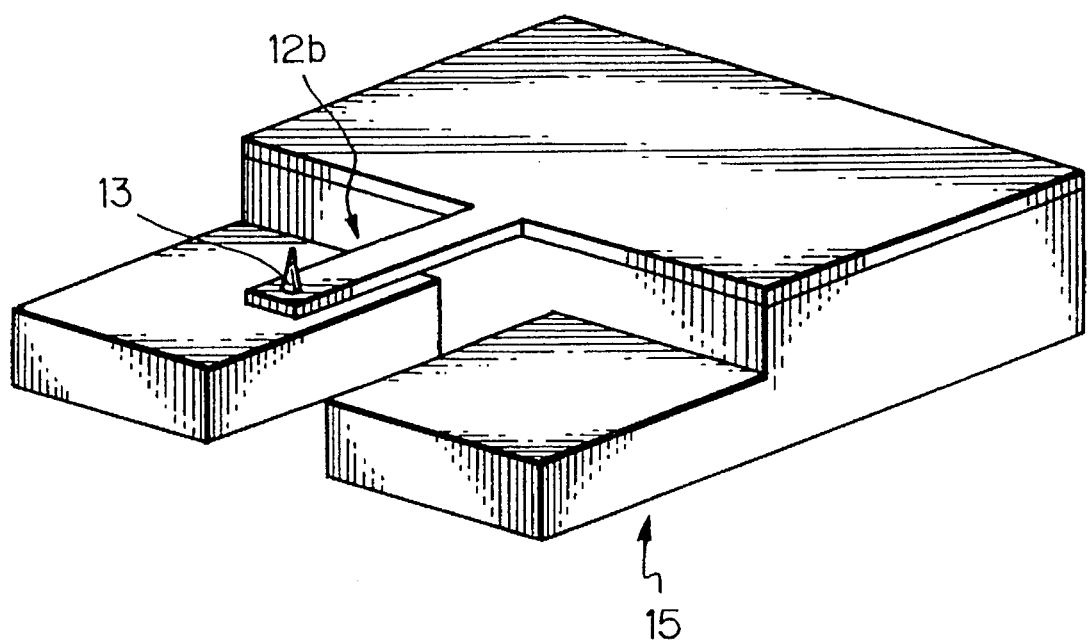
FIG. 3 is a perspective view showing the exterior appearance and structure of a cantilever for use with an atomic force microscope according to another embodiment of the invention.

FIG. 3 is a perspective view showing the exterior appearance and structure of the cantilever for use with an atomic force microscope. The cantilever of FIG. 3 differs from what is shown in FIG. 1 in that protective plates 15 are provided to insure that the cantilever beam 12 which is vulnerable to external mechanical stresses is appropriately protected. The protective plates 15 are processed from the base 11 in such a way that they are provided on the base (11) side of the cantilever beam 12 protruding from the base, with good clearance from the beam, and that they hold the beam therebetween; the protective plates 15 thus provided have adequate strength. The cantilever shown in FIG. 3 is also designed in such a way that laser light for detecting any displacement of the cantilever beam 12 can be applied to its reverse side by passing between the protective plates 15.

FIGS. 4 and 5 are diagrams illustrating the process of manufacturing cantilevers for use with an atomic force microscope that have the structures shown in FIGS. 1, 2 and 3. To manufacture those cantilevers, one may use a bonded wafer (manufactured by Fuji Electric Co., Ltd., 4 inch φ, (100) face) comprising a thermally oxidized ($SiO_2$) film 101 that is 2 μm thick and which is sandwiched between an upper single-crystal silicon (Si) substrate 102 and a lower single-crystal silicon (Si) substrate 103. The wafer is first treated with an aqueous KOH solution so that the upper (100) single-crystal silicon substrate 102 in a thickness of 20 μm of the bonded wafer is etched to a thickness of about 10 μm.

Figure 4A:
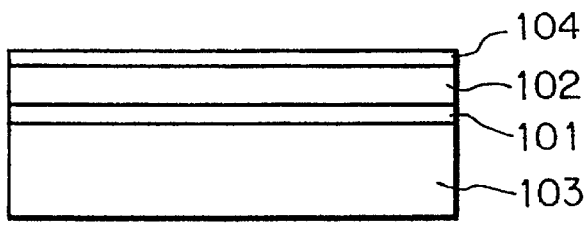
FIGS. 4a to 4e are diagrams that illustrate the first half of a process for producing the cantilever of the invention for use with an atomic force microscope.

Then, as shown in FIG. 4a, an RIE mask for forming stylus 13 is formed by overlying the silicon substrate 102 with a thermally oxidized film ($SiO_2$) 104 in a thickness of 0.7 μm.

Figure 4B:
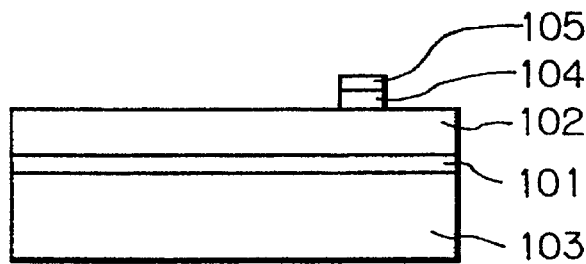

Subsequently, as shown in FIG. 4b, a circular patterned resist 105 having a diameter of 10 μm (or 15 μm) is formed on top of the thermally oxidized film 104 to form stylus 13.

With the resist 105 used as a mask, the upper exposed portion of thermally oxidized film 104 is etched away with BHF (buffered hydrofluoric acid).

Figure 4C:
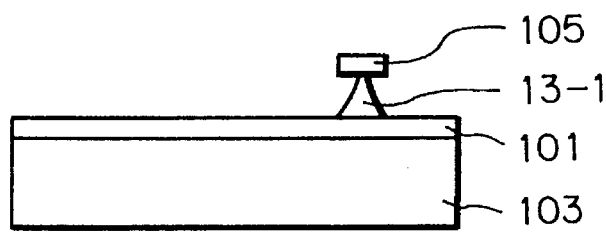

In the next step, with the circular thermally oxidized film 104 being used as a mask, the silicon substrate 102 is processed to a stylus shaped portion 13-1 by RIE as shown in FIG. 4c. The portion 13-1 is trimmed to a desired stylus shape by treatment with an aqueous KOH solution ($KOH:H_2O=30g/100$ ml). As a result of the treatments by RIE and KOH, the surface of the thermally oxidized ($SiO_2$) film 101 becomes exposed in the areas other than the stylus.

Figure 4D:
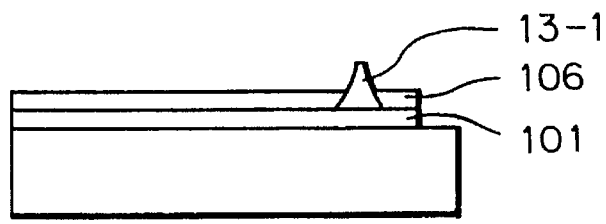

Then, as shown in FIG. 4d, a resist is applied to the top surface of the exposed thermally oxidized film 101 and a resist layer 106 having the geometry of cantilever beam 12 consisting of a basal portion 12a and a beam portion 12b is formed on top of the thermally oxidized film 101. Furthermore, the areas of the thermally oxidized film 101 that are not covered with the resist layer 106 are etched away by treatment with BHP, thereby shaping the thermally oxidized film 101 to the geometry of cantilever beam 12.

Figure 4E:
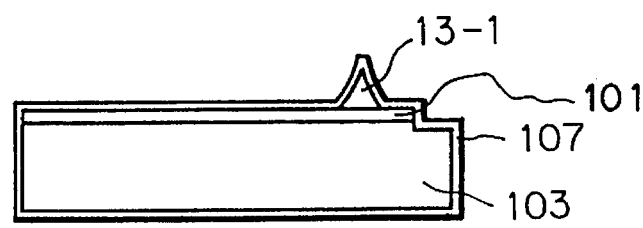

Subsequently, as shown in FIG. 4e, the resist layer 106 formed in step (d) is stripped and, in order to assure protection from a subsequent treatment with KOH and to provide a sharp tip for the stylus-shaped portion 13-1, the entire structure is thermally oxidized so that all surfaces of it are covered with a thermally oxidized film 107 in a thickness of about 0.2 μm.

Figure 5A:
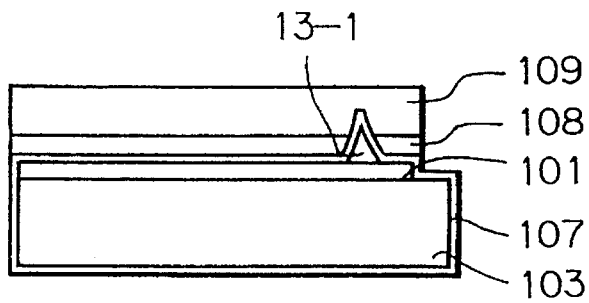
FIGS. 5a to 5e are diagrams illustrating the second half of the same process for cantilever production.

Then, as shown in FIG. 5a, a resist (OFPR-8600) layer 108 is formed on the top surface of the thermally oxidized film 101 shaped like the cantilever beam 12 so as to protect the latter from a subsequent BHF treatment. Then, in order to protect the stylus-shaped portion 13-1 from the subsequent BHF treatment, a thick coating resist (AZ-4620; 6 μm thick) was applied twice to form a resist layer 109 over the OFPR-8600 layer 108 shaped like the cantilever beam 12.

Figure 5B:
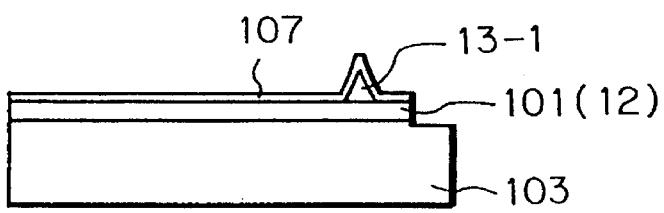

Subsequently, as shown in FIG. 5b, the thermally oxidized film 107 (0.2 μm thick) surrounding the area shaped like the cantilever beam 12 is etched away by BHF treatment to have the single-crystal silicon substrate 103 exposed in areas of the base 11 that serve as the foothold of the cantilever. Thereafter, the OFPR-8600 layer 108 and the resist layer 109 which protect the thermally oxidized layer 101 in the form of cantilever beam 12 are stripped.

Figure 5C:
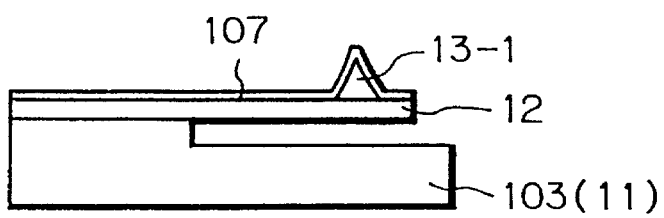

Then, as shown in FIG. 5c, the exposed silicon substrate 103 around the thermally oxidized film 101 shaped like the cantilever beam 12 is etched anisotropically with an aqueous KOH solution ($KOH:H_2O =30$ g/100 ml) so that the beam portion 12b of the cantilever beam 12 will be freely suspended from the silicon substrate 103. During the anisotropic etching, the stylus-shaped portion 13-1 remains intact since it is protected with the thermally oxidized film 107 in a thickness of 0.2 μm.

Figure 5D:
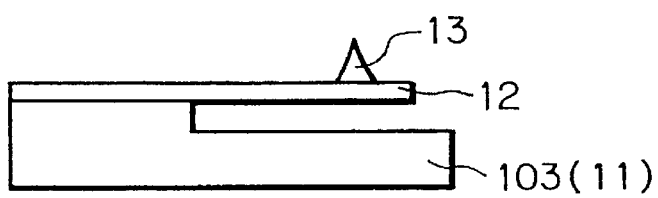
Figure 5E:
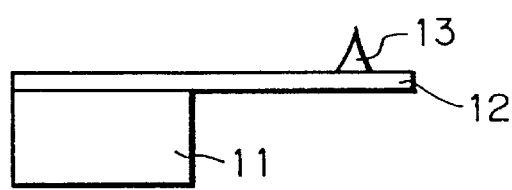
Figure 6A:
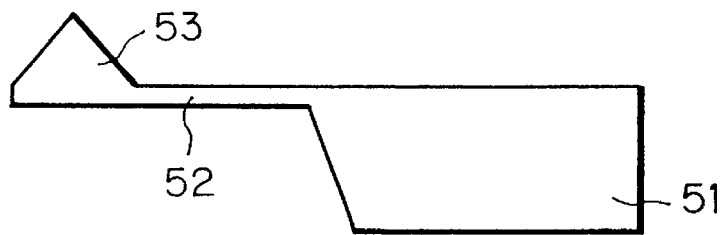
FIGS. 6a to 6d are sketches showing four prior art cantilevers for use with an atomic force microscope.
Figure 6B:
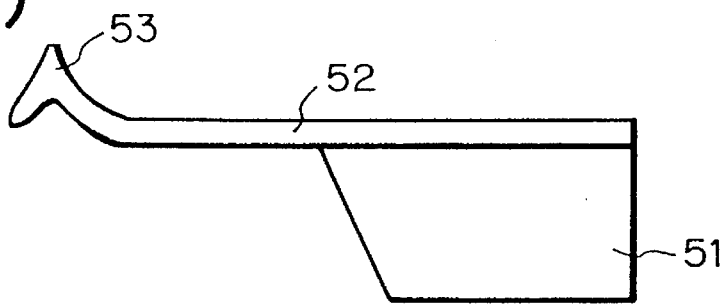
Figure 6C:
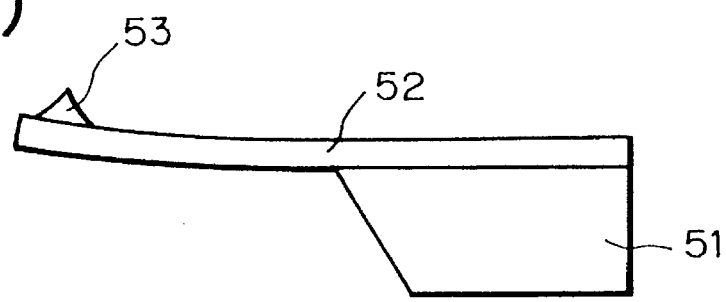
Figure 6D:
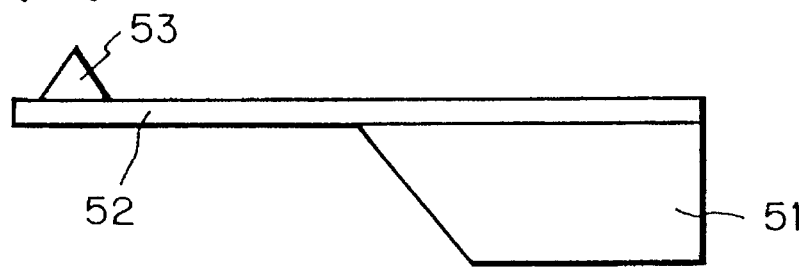

Subsequently, as shown in FIG. 5d, the thermally oxidized film 107 protecting the stylus-shaped portion 13-1 is lightly etched with BHF to sharpen the tip of the stylus-shaped portion 13-1, thereby forming a stylus 13.

In the final step, the silicon substrate 103 beneath the cantilever beam 12 is partly cut off to form the base 11, thereby completing the fabrication of a cantilever for use with an atomic force microscope of the type shown in FIGS. 1 and 2. To fabricate a cantilever for use with an atomic force microscope of the type shown in FIG. 3, protective plates 15 may be formed in the process of cutting off part of the silicon substrate 103.

To summarize the process described above, the single-crystal silicon substrate 103 serving as the cantilever base 11 is provided with the thermally oxidized (SiO$_2$) film 101 having a preliminarily designed thickness, which in turn is overlaid with the single-crystal silicon layer 102 to a thickness of a constant design value, thereby providing the three-layered structure, and the thermally oxidized film 101 is processed to form the cantilever beam 12 and the stylus 13 is processed from the overlying single-crystal silicon layer 102 of a constant thickness. The cantilever thus produced for use with an atomic force microscope has the stylus 13 made of single-crystal silicon which has a sharp tip and a constant height, and the cantilever beam 12 having an invariable spring constant. The protective plates 15 having adequate mechanical strength may be provided in such a way that they hold the cantilever beam 12 therebetween. The so modified cantilever has the advantage that the cantilever beam 12 is effectively protected against mechanical damage.

In either type of cantilevers, the stylus 13 is made of single-crystal silicon and does not contain microscopic grain boundaries which are inherent in polysilicon; therefore, the tip of stylus 13 can be sharpened to a curvature radius of 10 nm or below by a suitable technique such as the combination of dry etching (RIE) and thermal oxidation.

If the single-crystal silicon film has a (100) face, high-rate etching can be carried out with an aqueous KOH solution in the direction of film thickness so that the stylus 13 is rendered to have a height up to about 10 μm and a high aspect ratio. This is an advantage that cannot be realized in any prior art cases where the stylus 13 is a thermally oxidized film per se or formed of polysilicon.

The cantilever beam 12 is formed from the thermally oxidized film of a constant thickness and freely suspended from the silicon base 11. The means of etching the silicon base 11, such as wet etching with an aqueous KOH solution, that may be adopted to have the cantilever beam 12 freely suspended from the base 11 is totally inert to the thermally oxidized film. Hence, the thickness of the thermally oxidized film will in no way change during the process and the cantilever beam 12 will be formed exactly to the thickness of a design value with good reproducibility, which contributes to a marked improvement in the reproducibility of its spring constant.

If the single-crystal silicon base 11 has a (100) face, high-rate selective etching can be done with an aqueous KOH solution in the direction of film thickness and this offers the advantage of facilitating the processing of the protective plates 15 from the silicon base 11. To insure that the entire part of the cantilever is electroconductive, a metal such as gold that is soft enough not to affect the spring constant of the beam portion 12b of the cantilever beam 12 and which is chemically so stable that it will not deteriorate is applied to all surfaces of the cantilever in a thickness of no more than about 10 nm. The application procedure may be implemented satisfactorily by using a commercial sputtering apparatus.

The substrate of a three-layered structure described above is already marketed as a bonded substrate and is readily available. If necessary, the substrate may be fabricated by any known existing processes such as laser annealing and ion injection.

Thus, the present invention offers the following advantages.

(1) By adopting the design shown in FIGS. 1 and 2, one can produce a cantilever for use with an atomic force microscope that has a stylus of an abrupt profile with a sharp tip and a high aspect ratio, as well as a cantilever beam that has an invariable spring constant and which supports the stylus at an end.

(2) If the design shown in FIG. 3 is adopted, the cantilever beam which has been processed from the supporting base is protected against mechanical damage by means of the protective plates and this provides the cantilever with a structure that is rugged enough to resist external mechanical damage.

(3) Such improvement cantilevers for use with an atomic force microscope can be manufactured by adopting the processes discussed herein.

What is claimed is:

1. A cantilever for use with an atomic force microscope that comprises a single-crystal silicon base having adequate mechanical strength, a cantilever beam that is made from a silicon oxide film and which is joined at one end to said base, a conical stylus with a sharp tip that is formed on said cantilever beam at the other end which is opposite the end joined to said base, said conical stylus being made of single crystal silicon and having a height of 8–10 μm, an aspect ratio of at least 2, and said sharp tip having a curvature radius of 10 nm or below, wherein protective plates for protecting said cantilever beam against mechanical damage that are processed from said single-crystal silicon base and that have adequate strength are provided on the base side of said cantilever beam protruding from said base in such a way that they are spaced with good clearance from said cantilever beam but that they hold said cantilever beam therebetween, and wherein all surfaces of said cantilever are covered with a thin electroconductive film.

2. A cantilever for use with an atomic force microscope according to claim 1 wherein at least one of said protective plates has an opening through which laser light for measuring the amount of deflection of said cantilever beam caused by interatomic forces is to be applied onto the surface of said cantilever beam.

3. A cantilever for use with an atomic force microscope according to any one of claims 1 to 2 wherein said conical stylus has been processed from single-crystal silicon formed on the surface of said silicon oxide film by bonding.

4. A cantilever for use with an atomic force microscope according to claim 3 wherein said single-crystal silicon formed on the surface of said silicon oxide film by bonding has a (100) face.

5. A cantilever for use with an atomic force microscope according to any one of claims 1 to 2 wherein said cantilever beam formed of said silicon oxide film has thickness of 1–3 μm and a width of 15–30 μm and protrudes from said base by a length of 120–150 μm and wherein said conical stylus is formed at least 100 μm apart from the site at which said cantilever beam is joined to said base.

6. A cantilever for use with an atomic force microscope according to any one of claims 1 to 2 wherein the electroconductive material covering all surfaces of said cantilever is gold that has been deposited by sputtering in a thickness no greater than 10 nm.

\* \* \* \* \*

UNITED STATES PATENT AND TRADEMARK OFFICE
CERTIFICATE OF CORRECTION

PATENT NO.:     5,614,663
DATED     :     March 25, 1997
INVENTOR(S):    Junji ITOH et al.

It is certified that error appears in the above-identified patent and that said Letters Patent is hereby corrected as shown below:

On the title page:
   Item [75] Inventor's, please change "Junju" to --Junji --.

Signed and Sealed this

Twelfth Day of August, 1997

Attest:

BRUCE LEHMAN

*Attesting Officer*            *Commissioner of Patents and Trademarks*